United States Patent Office 2,852,437
Patented Sept. 16, 1958

2,852,437

CATALYTIC DESULPHURIZATION OF PETROLEUM HYDROCARBONS

Frederick William Bertram Porter and Ernest Carlton Housam, Sunbury-on-Thames, England, assignors to The British Petroleum Company Limited, London, England, a British joint-stock corporation No Drawing. Application July 6, 1955
Serial No. 520,347

Claims priority, application Great Britain July 6, 1954

2 Claims. (Cl. 196—24)

This invention relates to the catalytic desulphurization of petroleum hydrocarbons.

British patent specification No. 690,806 describes a process for the catalytic desulphurization of petroleum hydrocarbons which comprises passing the hydrocarbons without addition of hydrogen over a catalyst effective for the dehydrogenation of naphthenes to aromatics and the hydrogenation of organic sulphur compounds and which is not poisoned as a catalyst by the presence of sulphur compounds, under elevated temperature and pressure such that the feedstock is maintained substantially in the liquid phase and sufficient hydrogen is produced by dehydrogenation of naphthenes contained in the feedstock to convert organically combined sulphur contained in the feedstock into hydrogen sulphide. The process is preferably carried out using a catalyst consisting of the oxides of cobalt and molybdenum supported on alumina at a temperature of 700–800° F. and a pressure of 500 to 1000 lbs./sq. in.

It has now been found that improved desulphurization is obtained if the aforesaid process is carried out using a fluorine-promoted catalyst of the kind described in British patent specification No. 719,627.

According to the present invention, therefore, a process for the catalytic desulphurization of petroleum hydrocarbons comprises passing the hydrocarbons without addition of hydrogen over a catalyst consisting of the oxides of cobalt and molybdenum supported on alumina, said catalyst also containing a small proportion of fluorine, at elevated temperature and pressure such that the feedstock is maintained substantially in the liquid phase and sufficient hydrogen is produced by dehydrogenation of naphthenes contained in the feedstock to convert organically combined sulphur contained in the feedstock into hydrogen sulphide.

The catalyst may contain the oxides of cobalt and molybdenum as such or in combined form, and the content of fluorine may range from 0.1 to 6% by weight of the catalyst. Methods of preparing such a fluorine-promoted catalyst are described in the aforesaid British patent specification No. 719,627.

The process may be carried out under the following conditions:

Temperature_____ 700–800° F.
Space velocity_____ 0.5–5.0 v./v./hr.
Pressure_____ 400–1000 p. s. i. ga.

According to a specific example, a Kuwait gas oil having a sulphur content of 1.29% weight was passed over a catalyst consisting of the oxides of cobalt and molybdenum supported on γ-alumina (4–8 mesh size) and promoted by the addition of aluminium fluoride, at a temperature of 780° F., a pressure of 475 p. s. i. ga. and a space velocity of 2.0 v./v.hr. The catalyst had the following analysis:

| | Percent weight |
|---|---|
| Cobalt oxide | 3.2 |
| Molybdenum trioxide | 14.4 |
| Fluorine | 3.4 |
| Alumina | Balance |

A desulphurization of 72.1% was obtained over a period of 50 hours on stream compared with 60.7% using an unpromoted catalyst.

We claim:
1. A process for the catalytic desulphurization of petroleum hydrocarbons, which comprises passing the hydrocarbons without addition of hydrogen over a catalyst consisting of the oxides of cobalt and molybdenum supported on alumina, said catalyst also containing from 0.1 to 6% by weight of fluorine at a temperature within the range 700 to 800° F. and at a pressure within the range 400 to 1000 p. s. i. ga. such that feedstock is maintained substantially in the liquid phase and sufficient hydrogen is produced by dehydrogenation of naphthenes contained in the feedstock to convert organically combined sulphur contained in the feedstock into hydrogen sulphide.

2. A process according to claim 1, in which said petroleum hydrocarbons consist of a gas oil fraction.

References Cited in the file of this patent

UNITED STATES PATENTS

| 2,697,682 | Porter | Dec. 21, 1954 |
| 2,718,490 | Porter | Sept. 20, 1955 |
| 2,800,429 | Porter et al. | July 23, 1957 |

UNITED STATES PATENT OFFICE
CERTIFICATION OF CORRECTION

Patent No. 2,852,437                September 16, 1958

Frederick William Bertram Porter et al.

It is hereby certified that error appears in the above numbered patent requiring correction and that the said Letters Patent should read as corrected below.

Column 2, line 18, for "2.0 v./v.hr." read -- 2.0 v./v./hr. --; line 38, after "that" insert -- the --.

Signed and sealed this 6th day of June 1961.

(SEAL)
Attest:

ERNEST W. SWIDER               DAVID L. LADD
Attesting Officer               Commissioner of Patents